United States Patent Office 2,956,223
Patented Oct. 11, 1960

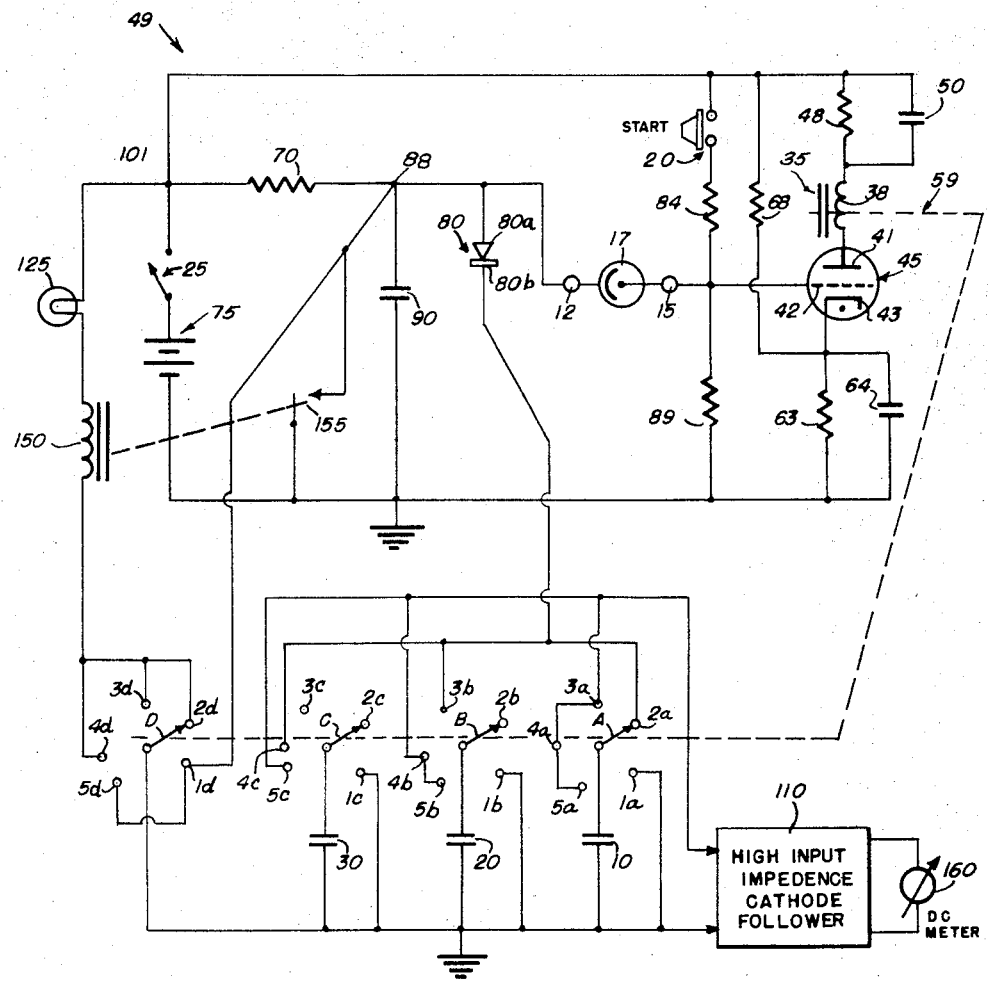

2,956,223

NEGATIVE RESISTANCE VOLTAGE BREAKDOWN TESTER

Nathan Cass, Sunnyvale, Calif., assignor to the United States of America as represented by the Secretary of the Army Filed Aug. 27, 1959, Ser. No. 836,558

6 Claims. (Cl. 324—24)

(Granted under Title 35, U.S. Code (1952), sec. 266)

The invention described herein may be manufactured and used by or for the Government for governmental purposes without the payment to me of any royalty thereon.

This invention relates generally to the testing of negative resistance devices, and more particularly to means for rapidly and automatically determining the breakdown voltage of a negative resistance device under simulated operating conditions.

In a variety of electronic circuit applications employing negative resistance devices, it is often necessary that the breakdown voltage, or the average breakdown voltage, of the negative resistance devices be known with considerable accuracy. This is particularly important where the negative resistance device is to be used in timing or relaxation oscillator circuits, because in such circuits the breakdown voltage ordinarily effects the timing or repetition rate obtained.

In the prior art, the accurate measurement of the breakdown voltage of large numbers of negative resistance devices has been a slow and tedious process. One of the reasons for this is that it is usually necessary to make a number of voltage breakdown tests in order to obtain an average value, since after long storage the initial breakdown voltage value of a negative resistance device is not always reliable.

Accordingly, it is the broad object of this invention to provide improved means for measuring the breakdown voltage of a negative resistance device.

Another object is to provide means for rapidly, accurately and automatically determining the average breakdown voltage of a negative resistance device.

A further object is to provide a device in accordance with the above-mentioned object which has the additional feature of being capable of determining the breakdown voltage of a negative resistance device under simulated operating conditions.

Still another object is to provide a device in accordance with any or all of the above objects which is relatively simple and compact.

In a typical embodiment of the invention, a stepping relay acts in cooperating with an R–C timing circuit and a thyratron circuit in which the relay coil is connected to cause a number of substantially equal capacitors to be automatically switched in and out of the R–C timing circuit, each capacitor charging to a voltage representing one breakdown voltage test of the negative resistance device. The stepping relay connects the capacitors to a high impedance cathode follower in such a way that the cathode follower directly and instantly reads out the average breakdown voltage for the number of tests completed. The R–C timing circuit is designed to simulate the conditions under which the negative resistance device is to be operated, and means are provided for automatically recognizing when performance falls below a predetermined minimum.

The specific nature of the invention, as well as other objects, uses, and advantages thereof, will clearly appear from the following description and from the accompanying drawing, in which:

The drawing is a schematic and block diagram of a negative resistance breakdown voltage tester, in accordance with the invention.

Referring to the drawing, an R–C timing circuit 59 comprises a power source represented by the battery 75 having its negative side grounded, resistor 70 having one side connected to the positive side of the battery 75 through the switch 25, and a capacitor 90 connected between the other side of the resistor 70 and circuit ground. The negative resistance device whose average breakdown voltage is to be determined is illustrated in the drawing as a gas tube diode 17 connected between suitable terminals 12 and 15. The terminal 12 is connected to the junction 88 between the capacitor 90 and the resistor 70, and the terminal 15 is connected to circuit ground through a resistor 89. The voltage of the battery 75 is made at least greater than the largest breakdown voltage expected, and preferably at least 20 percent greater.

A thyratron circuit 59 comprises a gas tube thyratron 45 having a cathode 43 connected to circuit ground through the parallel combination of a resistor 63 and a capacitor 64, a grid 42 connected to the terminal 15, and a plate 41 connected to the junction 101 through a coil 38 of a stepping relay 35 and the self-restoring network comprising the capacitor 50 in parallel with the resistor 48. The resistor 89 serves as the thyratron grid resistor. A resistor 68 connected between the thyratron cathode 43 and the junction 101 acts as a voltage divider with the resistor 63 to apply a cut-off bias to the thyratron 45.

A resistor 84 in series with a normally open push-button switch 80 is chosen in conjunction with the resistor 89, so that when the switch 80 is pushed, the thyratron 45 fires. The resistor 48 is made larger than is required to sustain conduction in the thyratron 45. Thus, when the capacitor 90 charges up to a voltage, which when subtracted from the voltage of the battery 75 is less than the thyratron conduction voltage, the thyratron 45 will cut off and the thyratron circuit 89 will return to its initial condition. The length of time of conduction of the thyratron 45 is principally determined by the R–C time constant of the resistor 48 and the capacitor 50, and should be made sufficiently long to provide an energization pulse to the coil 38 of the stepping relay 35.

The stepping relay 35 has, in addition to the coil 38, four poles A, B, C and D, each pole being movable between five contacts, these being 1a–5a, 1b–5b, 1c–5c and 1d–5d, respectively. The poles A, B, C and D are adapted to step synchronously from contact to contact in response to pulses applied to the coil 38, the stepping relay 35 advancing one step in response to each pulse applied to the coil 38. The stepping relay 35 is preferably designed so that when the poles A, B, C and D are at their fifth contacts, 5a, 5b, 5c and 5d, respectively, the next pulse applied to the coil 38 advances the poles to their first contacts, 1a, 1b, 1c and 1d, respectively. The drawing shows the poles of the stepping relay 35 at their second contacts. Stepping relays, such as 35, which operate as just described are well known in the art and can readily be provided.

Connected between the poles A, B, and C of the stepping relay 35 and circuit ground are the substantially equal capacitors 10, 20 and 30, the pole D being grounded. These capacitors 10, 20 and 30 are switched in and out of the R–C timing circuit 49 by the stepping relay 35 in response to pulses applied to the stepping relay coil 38 by the thyratron circuit 59, as will hereinafter be described.

The contacts of the stepping relay 35 are connected as follows: the contacts 2a, 3b and 4c are connected to the cathode 80b of a diode 80 whose plate 80a is connected to the junction 88 between the capacitor 90 and the resistor 70; the contacts 3a, 4a, 5a, 4b, 5b and 5c are connected to the high side of the input of a high input impedance cathode follower 110, the other input to the cathode follower 110 being grounded and the output of the cathode follower 110 being connected to a D.-C. meter 160; the contacts 2d, 3d and 4d are connected to the junction 101 through an indicating lamp 125 and a time delay relay 150 having a normally open contact 155 connected across the capacitor 90; the contacts 1a, 1b, 1c and 1d are connected to the junction 88; and the contacts 2b and 2c are left open.

The operation of the above-described voltage breakdown tester shown in the drawing may now be explained. The switch 25 is closed and the stepping relay 35 is placed in its starting position, that is, with the poles A, B, C and D being connected to contacts 1a, 1b, 1c and 1d, respectively. This starting position and the other positions of the poles may be indicated by a suitable dial on the stepping relay 35. If the stepping relay 35 is not in this start position, the start push-button switch 20 is depressed a sufficient number of times to pulse the coil 38 until the poles of the stepping relay 35 advance to the starting position. At this starting position it can be seen that the capacitors 10, 20, 30 and 90 are all shorted.

The negative resistance device 17 whose average breakdown voltage is to be determined is placed between the terminals 12 and 15, either by hand, or by automatic means if so desired. The start push-button switch 20 is then depressed, advancing the poles of the stepping relay to the second position, so that the poles A, B, C and D connect the contacts 2a, 2b, 2c and 2d, respectively. At this second position, it can be seen that: (1) the capacitor 90 is no longer shorted and thus begins to charge up through the adjustable resistor 70 towards the voltage of the battery 75; and (2) the capacitor 10 is unshorted and effectively placed in parallel with the capacitor 90 through the diode 80, the capacitor 10 thereby also charging up towards the voltage of the battery 75 through the low forward resistance of the diode 80. When the voltage across the capacitors 90 and 10 reaches the breakdown voltage of the negative resistance device 17, the device 17 breaks down causing the capacitor 90 to rapidly discharge through the device 17 and the resistor 89, until the voltage across the capacitor 90 falls below the conduction voltage of the device 17. The capacitor 10, however, remains at the breakdown voltage, being unable to discharge because of the high back resistance of the diode 80. Since only the capacitor 90 charges through the negative resistance device 17, the capacitor 90 is preferably chosen to have a value such that it will pass the same amount of charge through the device 17 as it would receive under actual operating conditions.

The resistor 89 is chosen in conjunction with the cut-off bias placed on the thyratron 45, so that when the negative resistance device 17 breaks down, the pulse of charge passing therethrough, if of a sufficient amount to indicate that the device 17 is performing properly, causes a voltage to be applied to the grid 42 which fires the thyratron 45. The firing of the thyratron 45 applies an energization pulse to the coil 38 advancing the poles of the stepping relay 35 to the third position where poles A, B, C and D connect contacts 3a, 3b, 3c and 3d, respectively. It can be seen that this results in: (1) placing the capacitor 10, which has been charged to the first breakdown voltage of the negative resistance device 17, across the input of the cathode follower 110, causing its voltage to appear on the D.-C. meter 160; and (2) connecting the capacitor 20 effectively in parallel with the capacitor 90. The R-C time constant of the resistor 70 and the capacitor 90 is chosen so that during the time between breakdown and the advancing of the stepping relay 35 to position 3, the voltage on the capacitor 90 has not risen significantly above the conduction voltage to which it was discharged at breakdown.

When the stepping relay 35 advances to position 3, therefore, the initial charge on the capacitor 90 is shared with the capacitor 20, causing an instantaneous voltage reduction thereacross. From this voltage reduction, the capacitors 90 and 20 then charge to the second breakdown voltage of the negative resistance device 17, at which time the capacitor 90 again rapidly discharges through the device 17 and the resistor 89, firing the thyratron 45 and advancing the stepping relay to the fourth position. As before, the second breakdown voltage of the device 17 is held on the capacitor 20 by the high back resistance of the diode 80.

When the stepping relay 35 advances to the fourth position, the poles A, B, C and D connect the contacts 4a, 4b, 4c and 4d, respectively. At this fourth position, the capacitor 20, which has been charged to the second breakdown voltage of the negative resistance device 17, is placed in parallel with the capacitor 10 across the cathode follower 110. The input impedance of the cathode follower 110 and the associated leads are chosen to be such that the capacitor 10 does not discharge and remains substantially at the first breakdown voltage. It can mathematically be shown that if the capacitors 10 and 20 are equal, the resulting voltage then appearing across these capacitors 10 and 20 when they are placed in parallel will be equal to the average value of the first and second breakdown voltages, and this average value appears on the D.-C. meter 160.

Also, at the fourth position of the stepping relay 35, the capacitor 30 is effectively placed in parallel with the capacitor 90, as were the capacitors 10 and 20. The capacitor 30 thus charges up to the third breakdown voltage of the negative resistance device 17, and upon breakdown of the device 17, fires the thyratron 45 advancing the stepping relay 35 to the fifth and final position, where the poles A, B, C and D connect the contacts 5a, 5b, 5c and 5d, respectively. At the fifth position the capacitor 30 is placed in parallel with the capacitors 10 and 20, the voltage across the capacitors 10 and 20 having remained at substantially the average of the first and second breakdown voltages because of the low leakage path. It can mathematically be shown that if the capacitors 10, 20 and 30 are equal, the placing of the capacitor 30 in parallel with the capacitors 10 and 20 will result in a voltage across the parallel combination equal to the average value of the first, second and third breakdown voltages. Also, it can be seen that at the fifth position of the stepping relay 35, the capacitor 90 is shorted so that the thyratron circuit 59 will not be triggered and the stepping relay 35 will remain at rest in the fifth position, with the capacitors 10, 20 and 30 connected across the cathode follower 110 and having a voltage equal to the average of the first, second and third breakdown voltages.

If the time taken for the stepping relay 35 to advance from its starting position at position 1 to position 5 is sufficiently long, as determined by the time constant of the timing circuit 49, it is possible for an operator to be able to read the D.-C. meter 160 at each position of the stepping relay. In position 3 the first breakdown voltage will be read, in position 4 the average of the first and second breakdown voltages will be read, and in position 5 the average of the first, second and third breakdown voltages will be read. However, if only the average of the three breakdown voltages is all that is desired, by suitably reducing the time constant of the timing circuit 49 the stepping relay 35 may be made to rapidly advance from the starting to the final position giving the average value on the meter 160 in a matter of seconds. The negative resistance device 17 may now be removed, the start push-button 20 depressed once to place the stepping relay 35 in the starting position, and the next negative resistance device connected in the tester. If desired, the start switch 20 may be connected in cooperation with another switch (not shown) which activates a suitable mechanism (also not shown) to automatically remove one negative resistance device 17 from the tester and replace it with another.

In the event that in some position the negative resistance device 17 fails to pass sufficient charge to trigger the thyratron circuit 59, this failure will be indicated by the operation of the time delay relay 150 and the indicating lamp 125 as follows. The time delay provided by the time delay relay 150 is chosen to be such that when the device 17 properly triggers the thyratron circuit 59 at each position, the stepping relay 35 advances from position to position in a time which is insufficient to energize the relay 150. However, if at some position the device 17 fails to pass sufficient charge to trigger the thyratron circuit 59, the stepping relay 35 will remain in this position for a considerably greater time. The time delay of the relay 150 is chosen so that this greater time is sufficient to energize the relay 150, causing its normally open contact 155 to short the capacitor 90. The stepping relay 35 will thus remain in the position at which the device 17 failed to pass the necessary charge, and the failure will be indicated by the indicator lamp 125 remaining lit. The stepping relay 35 may then be advanced to its initial position by depressing the start pushbutton switch 80 a sufficient number of times, and the "bad" device 17 removed and replaced by another. Time delay relays, such as 150 shown in the drawing, are well known in the art and can readily be provided.

It can be seen from the above description that this invention makes it possible to rapidly and accurately determine the average breakdown voltage of a large number of negative resistance devices under simulated operating conditions. It is to be understood, however, that the tester shown in the drawing is only exemplary and that various modifications in construction and arrangement may be made within the scope of the invention as defined by the appended claims. For example, any number of breakdown voltage tests can be made and obviously need not be limited to the three tests provided by the specific embodiment of the drawing. As long as the capacitors 10, 20, 30, etc., are all substantially equal, the meter 160 will always read the cumulative average breakdown voltage for the number of breakdown tests performed.

I claim as my invention:

1. A tester for determining the breakdown voltage of a negative resistance device, said tester comprising in combination: a first capacitor; means including a D.-C. power source and a resistor for charging said first capacitor towards a voltage which is at least greater than the breakdown voltage of the negative resistance device whose breakdown voltage is to be determined; a second capacitor and a diode in series; means for connecting said second capacitor and diode in parallel with said first capacitor so that said second capacitor is charged conjointly with said first capacitor, said diode being poled in the direction of flow of the charging current so as to act as a low resistance therefor; means for connecting the negative resistance device whose breakdown voltage is to be determined to said first capacitor so that when said first capacitor charges to the breakdown voltage of said negative resistance device said device breaks down causing said first capacitor to rapidly discharge through said device, the voltage across said second capacitor remaining substantially at the breakdown voltage of said device because of the high back resistance of said diode; means for isolating said second capacitor in response to the discharge of said first capacitor through said device; and means connected to said second capacitor for measuring the voltage thereacross.

2. A tester for determining the average breakdown voltage of a negative resistance device, said tester comprising in combination: a first capacitor; means including a D.-C. power source and a resistor for charging said first capacitor towards a voltage which is at least greater than the breakdown voltage of the negative resistance device whose average breakdown voltage is to be determined; a plurality of substantially equal capacitors; a stepping relay switching means having an energization coil and a plurality of poles and contacts; a diode; a high input impedance voltage measuring means; means for connecting the negative resistance device whose average breakdown voltage is to be determined to said first capacitor so that when said first capacitor charges to the breakdown voltage of said negative resistance device said device breaks down causing said first capacitor to rapidly discharge through said device; energization means connected to said coil for energizing said coil so as to advance said stepping relay switching means in response to the discharge of said second capacitor through said device; the poles and contacts of said stepping relay switching means being connected to said diode and to said plurality of capacitors so that for each breakdown test of said negative resistance device a different one of said plurality of capacitors is placed in parallel with said first capacitor through said diode as said stepping relay switching means advances, said diode being poled to permit each one of said plurality of capacitors to charge to the breakdown voltage of said device and remain substantially at this breakdown voltage because of the high back resistance of said diode; the poles and contacts of said stepping relay switching means further being connected so that the advance of said stepping relay causes each of said plurality of capacitors to be placed in parallel with the previously charged plurality of capacitors across said high impedance voltage measuring means after having been charged to the breakdown voltage of said device, said voltage measuring means thereby providing a running indication of the average breakdown voltage of said negative resistance device for the number of breakdown tests performed.

3. The invention in accordance with claim 2, wherein said first capacitor is chosen to have a value such that it will pass the same amount of charge through said negative resistance device as said device would receive during its intended operation.

4. The invention in accordance with claim 3, wherein said energization means are adjusted so that an energization pulse will be applied to said coil only when the charge passed through said device at breakdown is greater than a predetermined minimum value.

5. A tester for determining the breakdown voltage of a negative resistance device, said tester comprising in combination: a first capacitor having one end connected to circuit ground; means including a D.-C. power source and a resistor for charging said first capacitor towards a positive voltage with respect to circuit ground which is at least greater than the breakdown voltage of the negative resistance device whose average breakdown voltage is to be determined; a diode having its plate connected to the ungrounded end of said first capacitor; a plurality of substantially equal capacitors, the number of said plurality of capacitors being chosen equal to the number of breakdown tests for which it is desired that the average breakdown voltage of said device be determined; a stepping relay switching means having an energization coil, a plurality of poles, and a plurality of contacts over which each pole is movable, each of said plurality of capacitors being connected between a different one of said poles and circuit ground, there being at least the same number of poles as there is of said plurality of capacitors, and each pole having at least as many contacts as there is of said plurality of capacitors, said poles being adapted to advance synchronously from contact to contact in response to energization pulses applied to said coil, said poles advancing one step for each energization pulse; a self-restoring thyratron circuit biased to cut-off including a thyratron tube having a plate, a grid, and a cathode, and a grid resistor connected between said grid and circuit ground, the coil of said stepping relay switching means being connected in the plate circuit of said thyratron tube so that the firing of said thyratron tube applies an energization pulse to said coil; first and second terminals connected to the ungrounded end of said first capacitor and the ungrounded end of said grid resistor, respectively, the negative resistance device whose average breakdown voltage is to be determined being connected between said first and second terminals; a high input impedance cathode follower; and a D.-C. meter connected to the output of said cathode follower; the contacts of said stepping relay being connected to the cathode of said diode so that for each breakdown test of said negative resistance device a different one of the ungrounded ends of said plurality of capacitors is connected to the cathode of said diode so as to be placed in parallel with said first capacitor through said diode as said stepping relay switching means advances, each one of said plurality of capacitors thereby charging to the breakdown voltage of said device and remaining substantially at this breakdown voltage because of the high back resistance of said diode; said contacts further being connected so that the advance of said stepping relay switching means causes each of said plurality of capacitors to be placed in parallel with the previously charged plurality of capacitors across the input of said cathode follower after having been charged to the breakdown voltage of said device, said voltage measuring means thereby providing a running indication of the average breakdown voltage of said negative resistance device for the number of breakdown tests performed.

6. The invention in accordance with claim 5, wherein said first capacitor is chosen to have a value such that it will pass the same amount of charge through said negative resistance device as said device would receive during its intended operation, and wherein said grid resistor and the cut-off bias of said thyratron circuit are chosen so that said thyratron tube fires only when the charge passed through said device is greater than a predetermined minimum value.

References Cited in the file of this patent

UNITED STATES PATENTS 2,745,052     Willemse _____ May 8, 1956